Oct. 10, 1944.  M. F. PETERS ET AL  2,359,787
ICE DETECTOR
Filed Jan. 21, 1942
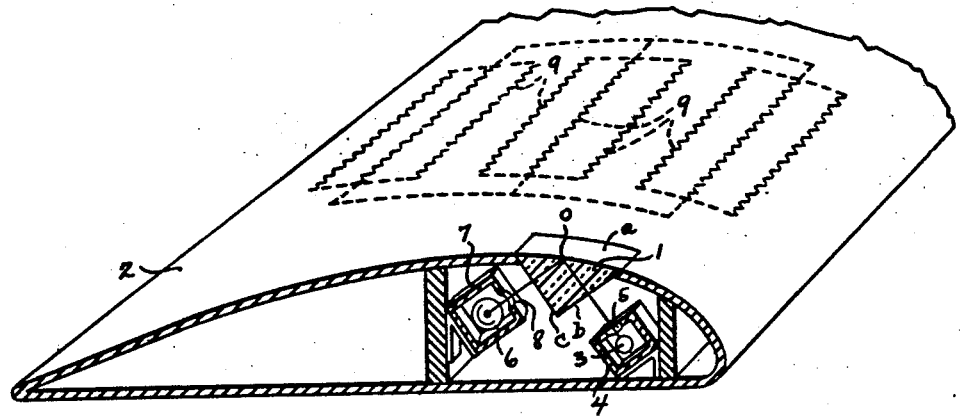
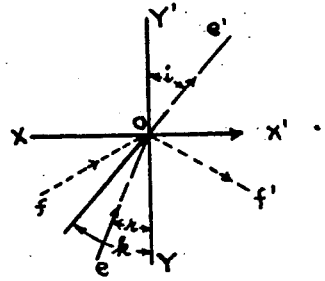
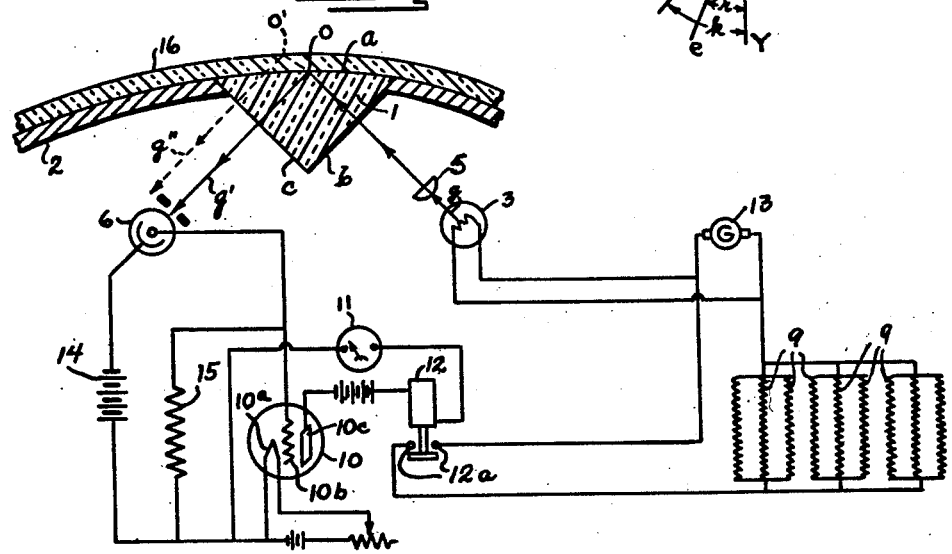
INVENTOR
Melville F. Peters, John P. Boston, and
Henry M. Taylor
BY
ATTORNEY Patented Oct. 10, 1944

2,359,787

UNITED STATES PATENT OFFICE 2,359,787

ICE DETECTOR

Melville F. Peters, Beltsville, and John P. Boston, Garrett Park, Md., and Henry M. Taylor, Dayton, Ohio Application January 21, 1942, Serial No. 427,620

3 Claims. (Cl. 177—311)

(Granted under the act of March 3, 1883, as amended April 30, 1928; 370 O. G. 757)

Our invention relates to apparatus for detecting the formation of ice upon a surface. The invention has particular utility when applied to aircraft where ice is quite common and dangerous, often bringing about a termination of flight. Ice may form upon an airfoil surface, particularly the leading edges of a wing. It may also form upon the interior surface of the air intake duct of the carburetor of an aircraft engine which is likewise very dangerous, often freezing the carburetor throttling mechanism.

It is therefore a broad object of our invention to provide an improved apparatus for detecting when ice begins to form on a surface so that a signal can be given and/or any deicing mechanism can be automatically set into operation.

A specific object of our invention is to provide an apparatus for detecting the presence of ice upon a surface, the primary elements of the apparatus comprising a light sensitive device and a source of light rays therefor, the rays being subject to a displacement from their normal position relative to the light sensitive device as ice forms upon the surface to change the amount of light received by the light sensitive device and thereby effect operation of the detecting means.

Another object of our invention is to provide an apparatus for detecting the presence of ice utilizing a light sensitive device and a source of light rays therefor, the rays being directed into a light pervious member and thence to the light sensitive device relative to which the rays are displaced upon the formation of ice upon a face of the light pervious member to thereby change the amount of light received by the light sensitive device, and which change in light is effective to cause detecting means such as an indicator or control device for initiating operation of suitable ice removal apparatus to operate.

A further object of our invention is to provide an apparatus for detecting the presence of ice utilizing a light sensitive device and a source of light rays therefor, the rays being directed into a light pervious member at such an angle as will cause them to be totally reflected from an exposed face of the light pervious member into the light sensitive device when there is no ice present on the face but being displaced away from the light sensitive device as a coating of ice forms upon the exposed face to thereby effect a change in the light received by the light sensitive device.

A more specific object of our invention is to provide apparatus for detecting the presence of ice upon a surface, which includes a prism-like light pervious member such as glass having one face exposed flush with the surface. A ray of light projected into the light pervious member so that it will strike the exposed face at an angle greater than the critical angle for the medium is totally reflected into a light sensitive device, but only in the event that the face is free from ice, thus providing for a change in light to be received by the light sensitive device, and which change may be utilized to operate an ice indicator and/or control the operation of any de-icing mechanism which may have been provided.

These and other objects of our invention will become more apparent from the following description and drawing.

For purposes of illustration, which in no way is intended as a limitation of the claims appended hereto, one embodiment of our invention is shown in the accompanying drawings and described herewith with respect to its application to an airfoil surface of an aircraft. In the various views of the drawing, like parts are designated by like reference characters.

Referring now to the drawing:

Fig. 1 is a diagram illustrating the phenomenon of total reflection of light which is utilized in the present embodiment of our invention.

Fig. 2 is a sectional view in perspective showing how our detecting apparatus may be inserted in an airfoil; and Fig. 3 is a diagrammatic representation of the detecting parts of our invention illustrated in Fig. 2, together with a suitable electric circuit for connecting the parts for operation.

Referring to Fig. 1, it is well known that when a ray of light $eo$ is caused to pass at an angle from one light pervious medium to another, the ray will be "bent" at the boundary X—X' between the two mediums, becoming $oe'$. This phenomenon of light is known as refraction. If, however, a ray of light $fo$ strikes the boundary between the two mediums at an angle to a normal YY' drawn between the mediums at $o$ greater than a critical angle $k$, the ray will not pass on through but will be reflected $of'$ back into the medium. This phenomenon is sometimes referred to as "total reflection" and the "critical angle" which varies in accordance with the particular mediums involved is determined by Snell's law.

According to Snell's law, if $i$ be the angle of the light ray in the less refractive medium and $r$ be the angle of the light ray in the more refractive medium, the ratio of the sines of such angles, $$\frac{\sin i}{\sin r}$$

is a constant, which may be termed $n$. If a ray of light travels from a more to a less refractive medium, angle $i$ will be greater than angle $r$. Since $$\sin r = \frac{\sin i}{n}$$

and since $i$ has a maximum limit of 90 degrees, $r$ has a maximum limit $k$ such that $$\sin k = \frac{1}{n}$$

No ray of light striking the boundary at an angle greater than $k$, $k$ being the critical angle, can emerge but will be totally reflected. For example, as between ice and air, the critical angle, $k$ is 48° 36'. For crown glass and air, $k$ is 43° 2'.

Referring now to Fig. 2, we provide a light pervious member 1 which is arranged so that one face $a$ thereof is substantially flush with the top surface of the airfoil 2. Face $a$ of member 1, which is prismlike, should obviously have a contour corresponding to the contour of the particular section of the airfoil in which it is situated in order to eliminate drag. Member 1 may be made of any suitable material which will transmit light, such as, for example, crown glass. The other two faces $b$ and $c$ of member 1 are preferably plane surfaces arranged at right angles to each other.

A light source 3 is suitably supported within a housing 4 interiorly of the airfoil 2 and a beam of light therefrom is projected through lens 5 into member 1 and normal to face $b$. Since faces $b$ and $c$ are at right angles to each other and the beam of light enters member 1 normal to face $b$, the said beam of light will strike face $a$ thereof at an angle of 45° to a normal to a tangent at the point $o$ on face $a$ at which the beam of light impinges. Since the critical angle for crown glass is less than 45°, the beam of light will not pass from member 1 at face $a$ thereof but will be reflected thereby.

This reflection of the beam of light reflected from face $a$ of the glass member 1, is caught by a photoelectric cell 6 which is suitably supported in housing 7. Housing 7 is provided with a relatively small opening 8 therein in order that the amount of light received by photoelectric cell 6 may be varied as the reflected beam of light is displaced when ice forms upon face $a$ of member 1.

Our invention may be utilized to control the operation of any suitable ice removal means. For purposes of illustration only, such may comprise a plurality of resistors 9 which are arranged in the top surface of the airfoil 2. However, such ice removal means per se do not form a part of our invention, our invention being directed only to such means as are utilized for controlling the operation of the ice removal means.

Referring now to Fig. 3 for further details of our apparatus, photocell 6 may be connected in the grid circuit of an electronic amplifier 10 having a filament 10a, grid 10b, and plate 10c. A control relay 12 and an indicator 11 such as a milliammeter are connected in the plate circuit of amplifier 10. Contacts 12a of relay 12 are connected to control the continuity of a circuit including a source of power such as generator 13 and resistors 9. Photocell 6 is connected in a circuit including a power supply 14 and resistor 15, the latter being connected between the grid 10b and filament 10a of tube 10.

Our device operates in the following manner: When the surface of airfoil 2 is free from a coating of ice, a ray of light $og$ from the light source 3 will strike a face $a$ of light pervious member 1 at $o$. Since light ray $og$ is at an angle which exceeds the critical angle for member 1, it will not pass on through face $a$ but will be reflected at $o$ to form ray $og'$. The reflected ray $og'$ strikes photocell 6 and, since the electrical resistance of photocell 6 is proportional to the amount of light received on the elements thereof, a predetermined current will flow therethrough in a circuit including the power supply 14 and resistor 15. The amount of this current flowing through resistor 15 will obviously determine the "bias" on grid 10b of the amplifier 10. The values of the component parts of the said grid circuit are so proportioned that when the reflected light ray $og'$ strikes upon photocell 6, grid 10b is of such a bias that the current flowing from filament 10a to plate 10c and thence through the energizing coil for relay 12 and indicator 11 is insufficient to cause either relay 12 to close its contacts 12a or an indication to be given by the indicating member of indicator 11.

Should, however, a coating of ice 16 build up upon the surface of airfoil 2 and face $a$ of light pervious member 1, the ray of light $og$ will no longer be reflected at $o$. Since the critical angle as between glass and water is approximately 70°, the ray of light $og$ will pass into the coating of ice 16, becoming ray $oo'$, and being refracted slightly upon entry because of the difference in their indices of refraction. If the angle of ray $oo'$ with respect to a normal at the surface of the ice coating through $o'$ exceeds 48° 36', this being the critical angle as between ice and air, ray $oo'$ will not pass into the air but will be reflected at $o'$ as ray $og''$. Ray $og''$ will not now impinge upon the light sensitive elements of photocell 6, since it will have been displaced beyond the aperture 8 in casing 7. If, on the other hand, the angle of ray $oo'$ with respect to a normal through point $o'$ is less than 48° 36', ray $oo'$ will not be reflected but will pass into the air being refracted at $o'$. In either event photocell 6 will no longer receive light from source 3 and its resistance to current flow therethrough is therefore increased, causing a decrease in the amount of current flowing through resistor 15 and hence producing a change in the bias of grid 10b of amplifier 10. This change in bias of amplifier 10 is sufficient to materially increase the current flow in the plate circuit thereof which includes the winding of relay 12 and indicator 11, and such increase is sufficient to cause the contacts 12a of relay 12 to close and the indicating element of indicator 11 to operate.

When contacts 12a are thus closed, a circuit will be completed from the power source 13 to the resistor heater units 9.

When the coating of ice has been melted by the heat from the de-icer heating units 9, the beam of light from source 3 again will be reflected at point $o$ on face $a$ of member 1, and its reflection will again impinge upon the elements of photocell 6, thus restoring the bias of the grid 10b of amplifier 10 to its original value. The subsequent reduction in current flow through the plate circuit of amplifier 10 will then be insufficient to keep the contacts 12a of relay 12 closed, thus breaking the circuit from power source 13 to the resistor heating units 9.

Likewise, the reduction in current flow in the plate circuit of amplifier 10 will also cause the indicating element of indicator 11 to move back to its initial position.

As hereinbefore stated in the introduction to the description of the illustrated embodiment, our invention may be applied to any surface upon which ice may form and is not to be limited to any specific application. If desired, the apparatus may be utilized with the indicator 11 alone, in which case the operator could manually turn on the de-icing mechanism when the indicator showed that ice was forming. Or the apparatus may be made entirely automatic and the indicator eliminated, if desired. Likewise, certain other changes and modifications in the particular apparatus shown and described will occur to and may be made by those skilled in the art without departing from the spirit and scope of our invention.

For example, the photoelectric cell may be positioned to receive light rays which are refracted through, rather than totally reflected from, a light pervious member, in which case a layer of ice as it is built up upon a face of the light pervious member would cause a shift in the refracted rays away from or into the cell 6. This shift in the ray relative to the photoelectric cell would then cause a change in its electrical conducting characteristics which would be effective to operate an indicator or turn on the de-icing mechanism.

We therefore desire it to be understood that only such limitations as are imposed by the prior art shall be placed upon the appended claims.

The invention described herein may be manufactured and used by or for the Government of the United States of America for governmental purposes without the payment of any royalties thereon or therefor.

Having thus set forth our invention, we claim:

1. Apparatus of the class described comprising, a light pervious member, said member being positioned so as to expose at least a portion of one face thereof with an exposed surface subject to icing, means for directing a beam of light into said light pervious member at such an angle as will cause said beam to be reflected at the exposed face portion thereof, a light sensitive device disposed to receive at least a portion of said reflected light beam when the exposed face portion of said light pervious member is free from ice, and control means responsive to a change in characteristic in said light sensitive device as said reflected light beam is displaced by formation of ice upon the exposed face portion of said light pervious member.

2. Apparatus of the class described comprising, a light pervious member, said member being positioned so as to expose at least a portion of one face thereof with an exposed surface subject to icing, means for directing a beam of light into said light pervious member and at such an angle as will cause said beam to be reflected back into said member from the exposed face portion thereof, a photoelectric device disposed to receive at least a part of the reflection from said light beam, a power source, control means, and means connecting said control means and said photoelectric device in an electrical circuit to said source of power, said control means being operable in response to a change in current in said circuit effected by a change in conductivity in said photoelectric device as said reflected light beam is displaced by the formation of a coating of ice upon the exposed face portion of said light pervious member.

3. Apparatus of the class described comprising, a prism-like light pervious member having a critical angle less than 45°, said member including two plane faces at right angles to each other and a third face the contour of which conforms substantially to the contour of an exposed surface subject to icing, said light pervious member being positioned so as to expose the said third face thereof with said exposed surface, means for directing a beam of light into said light pervious member normal to one of the plane faces thereof so that said light beam will impinge upon and be reflected by the said third face thereof, a photoelectric device disposed to receive said reflected light beam, a power source, control means, and means connecting said control means and said photoelectric device in an electrical circuit to said source of power, said control means being operable in response to a change in current in said circuit effected by a change in conductivity of said photoelectric device as said reflected light beam is displaced by the formation of a coating of ice upon the said third face of said light pervious member.

MELVILLE F. PETERS.
JOHN P. BOSTON.
HENRY M. TAYLOR.